United States Patent [19]
Macovski

[11] 4,058,003
[45] Nov. 15, 1977

[54] ULTRASONIC ELECTRONIC LENS WITH REDUCED DELAY RANGE

[75] Inventor: Albert Macovski, Menlo Park, Calif.

[73] Assignee: The Board of Trustees of the Leland Stanford Junior University, Stanford, Calif.

[21] Appl. No.: 707,329

[22] Filed: July 21, 1976

[51] Int. Cl.² ............................................. G01N 9/24
[52] U.S. Cl. ................................... 73/609; 128/2 V; 73/629; 73/620; 73/617
[58] Field of Search .......................... 73/67.9, 67.8 S; 340/1 R, 5 MP; 128/2 V, 2.05 Z

[56] References Cited
U.S. PATENT DOCUMENTS

| | | | |
|---|---|---|---|
| 3,090,030 | 5/1963 | Schuck | 340/1 R |
| 3,739,324 | 6/1973 | Coltman | 340/5 MP |
| 3,918,024 | 11/1975 | Macovski | 73/67.8 S |
| 3,919,683 | 11/1975 | Itamura et al. | 73/67.9 |
| 3,936,791 | 2/1976 | Kossoff | 73/67.8 S |
| 3,964,014 | 6/1976 | Telton | 340/5 MP |

Primary Examiner—Richard C. Queisser
Assistant Examiner—Anthony V. Ciarlante

[57] ABSTRACT

Ultrasonic reflections are received by a transducer array whose resultant signals are passed through an array of time-varying delay lines to provide focusing at all depths. The delay lines are made up of a combination of two components, one increasing and one decreasing with the distance to the axis of the array. This combination minimizes the range of delay variations required over the depth range. When using charge coupled devices as delay elements, this combination minimizes the required range of clock frequencies.

16 Claims, 4 Drawing Figures

ULTRASONIC ELECTRONIC LENS WITH REDUCED DELAY RANGE

The invention described herein was made in the course of work under a grant from the Department of Health, Education, and Welfare.

BACKGROUND OF THE INVENTION

1. Field of the Invention

This invention relates to ultrasonic imaging systems. In a primary application the invention relates to dynamically-focused receiver systems using arrays of transducers and time-varying delay lines.

2. Description of Prior Art

Ultrasonic imaging techniques are widely used for non-destructive testing in industry and for visualizing soft tissue structures in medical diagnosis. One of the principal difficulties with the existing instruments stems from the use of non-focused patterns in the transmit and receive modes. Thus the lateral resolution is determined primarily by the transducer size and by diffraction spreading. This results in a fundamental compromise in the size of the transducer aperture. A large transducer results in a uniform collimated beam pattern with relatively poor lateral resolution throughout the depth of the object. A small transducer results in good lateral resolution at small depths but, due to significant diffraction spreading, results in significant deterioration at the longer depths. Most transducer apertures are about one cm. in extent as a resolution compromise.

In an effort to provide improved lateral resolution in B scan imaging, lens systems are often used which improve the lateral resolution at the region of focus but not elsewhere. When using transducer arrays, electronic focusing can be accomplished by dynamically varying the delay applied to each transducer signal as the ultrasonic wave propagates. One such system has been described by G. Kossoff in "An Historical Review of Ultrasonic Investigations at the National Acoustic Laboratories," *J. Clinical Ultrasound*, Vol. 3, p. 39, March 1975. In one of his systems Dr. Kossoff uses a concentric ring array with time-varying delay lines connected to each ring to provide dynamic focus. This was also described at the meeting of the American Association for Ultrasound in Medicine in Seattle, Washington in October 1974. This system is not capable of electronic deflection and is therefore mechanically scanned to produce a two-dimensional image. A system using a linear transducer array with electronic deflection and focusing was described by F. L. Thurstone in "A New Ultrasound Imaging Technique Employing Two-Dimensional Electronic Beam Steering," Acoustical Holography, Vol. 5, Plenum Press. Here switched delay lines are connected to each transducer output and used to provide beam deflection and dynamic focus.

In both of these systems the delay elements represent a significant problem. They are noisy, difficult to rapidly switch, bulky, and require a relatively large delay range. In order to solve many of these problems the CCD (charge coupled device) is used as the analog variable delay element because of its small size and simplicity. It makes possible a hand-held ultrasonic probe, which is important to physicians. The use of CCD's in this dynamic focusing application is described by J. Shott and R. Melen in "The Rozorback CCD: A High-Performance Parallel Input Delay Line Architecture," Proc. of 1975 Int. Solid State Circuits Conf., pp. 150–151, February 1975. Although the CCD delay elements solve many of the problems, the large depth range required in ultrasonic imaging systems requires a correspondingly large range in clock frequencies. Since the lowest clock frequency is set by the signal sampling rate, the highest frequency can become greater than the capability of CCD technology.

Another system using variable delay elements for dynamic focusing is described in U.S. Pat. No. 3,918,024 issued to A. Macovski, entitled, "Ultrasonic Array for Reflection Imaging." In this system a weighted ring array is used as the transmitter to provide good resolution in one dimension at all depths. The electronic focus is accomplished by time-varying delay lines such as CCD's with controlled clock frequencies. These delay lines, however, require a large range in order to focus over the desired depth range. This range, as previously mentioned, may well be beyond that presently available with CCD's. In addition to electronic focusing, this patent described methods to provide electronic deflection by using an array of controlled delay elements which are changed following each scan line so as to provide a sector scan.

The present invention is directed toward reducing the delay range for any variable delay system, including the CCD's. A paper based on the application of this invention to reducing the delay range using CCD's is, "CCD Dynamically Focused Lenses for Ultrasonic Imaging Systems," by R. D. Melen, J. D. Schott, J. T. Walker and J. D. Meindl, Proc. of the International Conference on Applications of CCD, San Diego, Oct. 29–31, 1975.

SUMMARY OF THE INVENTION

An object of this invention is to achieve dynamic focusing over the entire depth of interest in ultrasonic imaging systems. A further object of this invention is to minimize the relative variations in delay required in dynamically-focused ultrasonic imaging systems.

Briefly, in accordance with the invention, an array of ultrasonic signals are passed through a time-varying delay system. This system consists of two delay structures, one increasing and the other decreasing in delay with the distance to the axis. When either or both of these delay structures are varied in time, only relatively small changes are required to achieve focusing, thus minimizing the relative delay range required. When using CCD's, this represents a relatively small change in clock frequency. Alternatively the delay system can involve a lens and a time-varying delay structure to achieve the same result.

BRIEF DESCRIPTION OF THE DRAWINGS

For a more complete disclosure of the invention, reference may be made to the following detailed description of several illustrative embodiments thereof which is given in conjunction with the accompanying drawings, of which.

DESCRIPTION OF THE PREFERRED EMBODIMENT

In ultrasonic A mode and B mode imaging systems a pulsed wavefront is propagated through the object of interest and a sequence of reflections are received. Since the velocity of propagation is known within a small variation, the time each reflection is received substantially represents its depth. One of the primary problems in these systems is that of lateral resolution. Since the wavelengths $\lambda$ used, of about 0.5 to 1.0 mm, are comparable to the resolution of interest, the resolution considerations are dominated by diffraction. When ultrasonic reflections are received by a transducer of lateral dimension D, the resolution size in the near field region, a distance of approximately $D^2/\lambda$ from the transducer, is essentially that of the transducer size itself, the distance D. Appreciably beyond $D^2/\lambda$, the beam diverges with an angle of about $\lambda/D$ so that the resolution is approximately $(\lambda/D)z$ where $z$ is the depth. Thus a larger transducer deteriorates the near field resolution and helps the far field resolution and vice versa. Most commercial instruments use approximately a 1 cm. transducer which provides a near-field collimated beam for most of the depth of interest in the body.

The resolution can be optimized at specific planes by using a focusing lens. The lens is capable of focusing in the near field region to produce a resolution at the focal plane of $(\lambda/D)f$ where $f$ is the focal length of the lens. In this case the resolution is improved with increasing the transducer size D. Unfortunately, however, this small resolution size is achieved in one depth region only, with all other depths having a significantly larger pattern. Since ultrasonic waves travel at relatively low velocities of 1500 meters/sec in water, an electronic focusing system can be used to dynamically focus at each depth plane of the propagating pulse so that diffraction-limited lateral resolution is always achieved.

Electronic focusing is accomplished using an array of ultrasonic transducers which receive the reflections from a region at different times because of the differences in path length to each transducer. An array of delay elements are used on the transducer signals to compensate for the differences in propagation time. The delay-line outputs are summed in an adder to produce a focused signal which represents equal total delay from the depth plane of interest to the adder. If the delay lines are varied in time the focusing can be accomplished at all depths as the pulse propagates.

Figure 1:
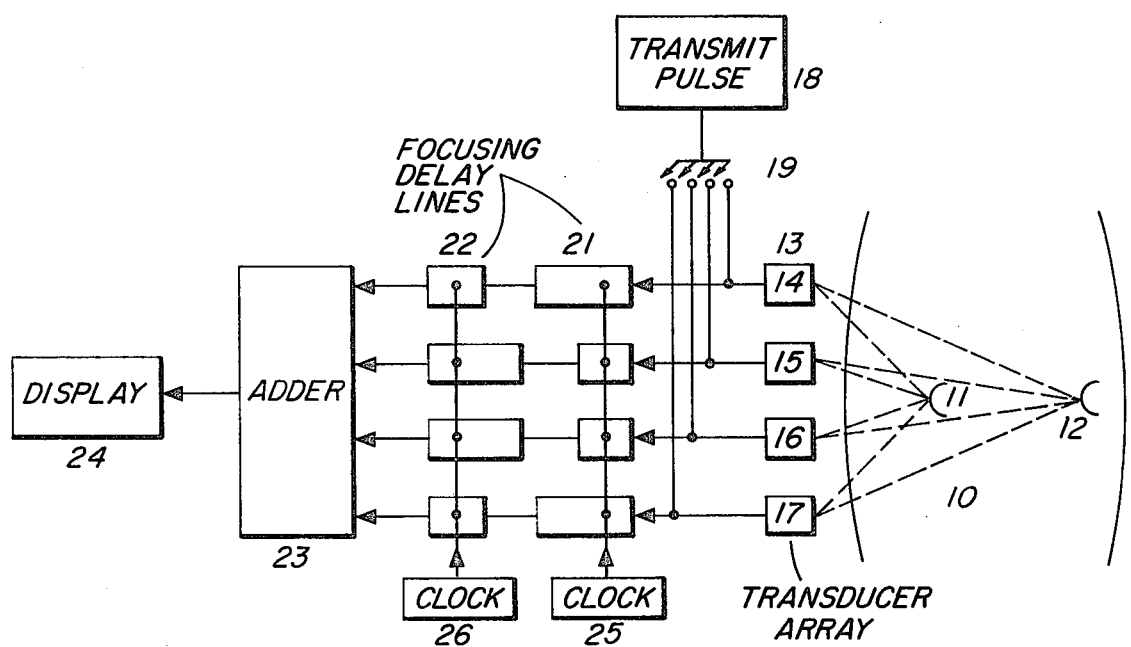
FIG. 1 is a block diagram illustrating an embodiment of the invention using a linear transducer array.

Referring to FIG. 1, a linear array 13 is used for providing dynamic focus in one dimension. For simplicity only four elements, 14-17, are shown in the array. Initially object 10 is insonified with a propagating ultrasonic pulse. This can be accomplished by using the transducers of array 13 as a transmitting array by closing multipole switch 19. This connects all of the array elements to transmit pulse generator 18. A pulsed ultrasonic wave will begin propagating through the object having lateral dimensions of approximately the size of the array. The wave excites each of the reflective surfaces in object 10. Reflective surfaces 11 and 12 are shown as examples. The round trip propagation time from each transducer to the on-axis reflecting surfaces and back is given by $$T_p = 2r/c = (2/c)\sqrt{x^2 + z^2}$$

where $r$ is the distance from each transducer to the on-axis reflector, $z$ is the depth of the reflector, $x$ is the coordinate along the transducer and $c$ is the velocity of propagation. The transducer is followed by an electrical delay line having, for each $z$ plane, a delay of $T_0 - (T_p - (2z/c))$, where $T_0$ is a fixed delay and $2z/c$ is the delay of the central element where $x = 0$. Thus the total delay of each reflected wave from reflector to the transducer to the adder 23 is $T_0 + (2z/c)$. This equal delay at each depth provides focusing for signals on the axis at plane $z$. Reflections from other lateral positions will arrive at differing times in the adder so that their relative phases will add destructively and thus provide a low amplitude at the output. The $2z/c$ portion of the total delay represents the different times at which signals from different depths are received. The purpose of the focusing delay mechanism is to equalize the delay from the different received transducer signals from each reflection.

Since the reflections of interest usually make a relatively small angle with the axis of the array, we can use the paraxial approximation where $T_p$ is given by $$T_p \cong \frac{2}{c}\left(z + \frac{x^2}{2z}\right)$$

$$\cong \frac{2z}{c} + \frac{x^2}{zc}$$

The first term, $2z/c$, is the exact value of the round-trip time to the center element. It is this time which defines the depth plane of each reflection. The second term, $x^2/zc$, approximates the differences in the propagation time from the reflector to each transducer at position $x$. Thus the propagation time differences increase approximately as the square of the distance from each transducer to the center or axis of the array. If a more accurate representation of $T_p$ is used, for reflections received at steep angles, additional terms must be used including higher even powers of $x$ such as $x^4$ and $x^6$. In general, however, the differences in propagation time increase as the magnitude of the distance to the transducer axis.

To focus on a reflection from a given depth $z$ a set of delay elements are used which compensate for the delay differences, $x^2/zc$, so that the reflections from each transducer add in phase. Since a given fixed delay in each signal path does not affect the focusing, the delay applied to each transducer signal is made $T_0 - (x^2/zc)$. In that way the total delay from a reflection to the transducers and through the array of focusing delay elements are each $T_0 + (2z/c)$.

Thus, referring to FIG. 1 and ignoring the clocks 25 and 26 and delay lines 21, if the delay lines 22 each had values $T_0 - (x^2/zc)$, the signals applied to adder 23, originating from depth $z$, would add in phase and produce a focused signal which is applied to display 24. In addition if these delay lines 22 were made time varying so as to have the required $T_0 - (x^2/zc)$ delay at each depth, as the transmitted ultrasonic wavefront propagates, focusing would be achieved at all depths.

The difficulty with this arrangement is in the large delay variation which must be achieved. The delay change, $\Delta T$, is given by $$\Delta T = (x^2/z_{min}c) - (x^2/z_{min}c)$$

In ultrasonic imaging $z_{min}$ is approximately 1.0 cm and $z_{max}$ approximately 25 cm. The difficulty of achieving this large variation in delay depends on the type of delay line used. In any case the problem is complicated by the fact that the delay line must also pass the relatively high ultrasonic frequencies in the 2–3 mhz range. In modern integrated circuit technology Charge Coupled Devices (CCD's) are excellent candidates for variable delay lines. In these devices a charge packet, representing the analog signal, is moved along at a rate determined by the clock frequency. The minimum clock frequency must be at least twice the highest signal frequency as dictated by the sampling theorem. This frequency would then determine the maximum delay corresponding to the closest depth plane $z_{min}$. The minimum delay is reached by using a very high clock frequency. If a frequency of about 5.0 mhz is used for the maximum delay to satisfy the sampling requirement, a frequency approaching 100 mhz might be required for the minimum delay corresponding to the furthest depth plane. This is beyond the state-of-the-art in CCD technology.

The solution to the problem is the use of two arrays of delay structures with opposing variations of delay with transducer position as shown in FIG. 1. The first focusing array of delay structures 21 consists of an array of lines whose delay variation increases approximately as the square of the distance of each transducer to the axis of the array. Thus the transducer signals from transducers 15 and 16 have less delay in delay-line array 21 than the signals from transducers 14 and 17. Although these delay line elements can represent a variety of structures, in FIG. 1 they are indicated as CCD delay lines driven by clock generator 25. Delay array 21 is followed by a second focusing array of delay structures 22 which is driven by clock generator 26. In this delay array the delay variation decreases approximately as the square of the distance to the axis of the transducer array. Thus the delay used for the signals from transducers 15 and 16 is larger than that of transducers 14 and 17. In this general way relatively small changes in delay are required in delay line arrays 21 or 22 in order to provide the desired variation in delay with transducer position. In systems using CCD's, this means a relatively small change in clock frequency is required, a very important parameter for the use of CCD's. The outputs of both delay systems 21 and 22 have the delays equalized from the ultrasonic reflections. When they are added in adder 23 they add in phase from the depth corresponding to the propagation time of the ultrasonic wave. A focused signal is formed representing that depth plane and having the desired lateral resolution properties of a focused system. This signal is displayed in display 24 in the conventional B-mode display.

In general delay lines 21 have delays of $k_1 x^2$ and delay lines 22 have a delay of $T_0 - k_2 x^2$ where $x$ is, as before, the distance from each transducer to the axis of the array and $k_1$ and $k_2$ are the parameters of each delay array. $T_0$ must be at least equal to $k_2 x_{max}^2$. The total delay is thus $T_0 + (k_1 - k_2)x^2$. If $k_1$ and $k_2$ are made relatively large, they each have to be fractionally changed only slightly for their difference to have the desired range of $(x^2/z_{min}c) - (x^2/z_{max}c)$. Either or both of lines 21 and 22 can be time-varying. To achieve the maximum delay variation they would each be time-varying in the opposite sense. Thus, for the minimum depth, which requires the greatest delay difference, $k_1$ would decrease and $k_2$ would increase. If lines 21 and 22 were CCD's, as the transmitted pulse begins to propagate clock 26 would be at its lowest frequency and clock 25 at its highest frequency to provide the maximum decrease of delay with distance to the axis. As the pulse propagates toward greater depths the frequency difference between 26 and 25 would decrease until they approach each other for infinite depths. Using appropriately long CCD's clock frequency variations of a few percent can provide the entire delay range rather than the variation of greater than an order of magnitude which is otherwise required.

Similar results can be obtained with either 21 or 22 a fixed array of delay lines and the other time-varying. Here again $(k_1 - k_2)x^2$ can be made to have a large variation while one of them, $k_1$ or $k_2$, has a relatively small variation. In FIG. 1 the delay elements which increased in delay with distance to the axis 21 preceded those which decreased 22. These can be reversed in sequence with no change in the system.

Figure 2:
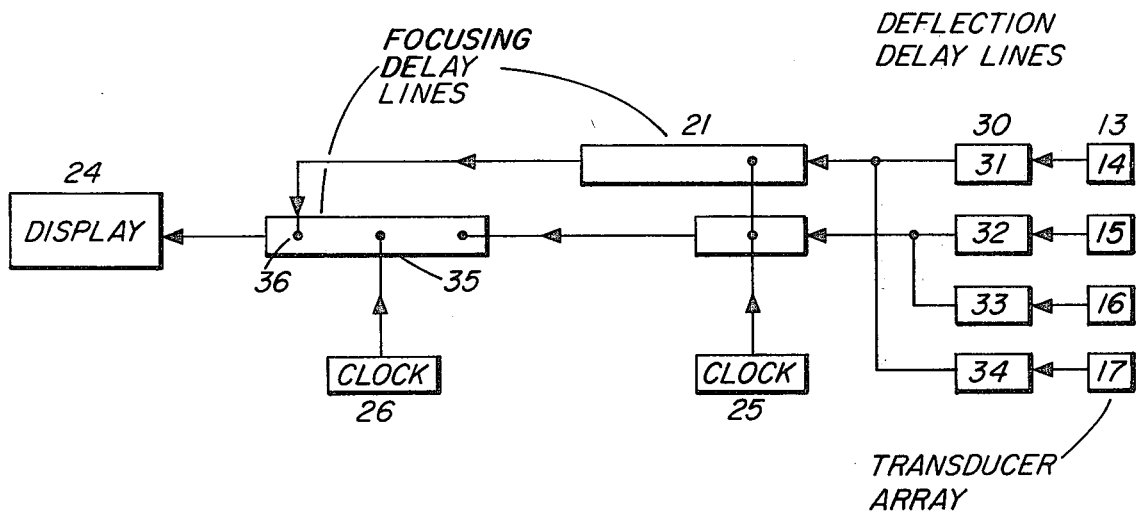
FIG. 2 illustrates an embodiment using electronic deflection and focusing.

In order to achieve a B-scan the transducer array 13 of FIG. 1 would have to be mechanically scanned along the object to create a sequence of lines representing the reflectivity of the object. These lines are displayed on display 24 whose slow scan is synchronized with the motion of the array. To create a real-time electronic system, in addition to dynamic focus, a system of electronic deflection is required as shown in FIG. 2. Here an additional array of deflecting delay elements 30 is used to provide steering of the beam so that a sector scan is created with each scan line at a slightly different angle. The reflection from a point $x_0$ from the axis, at a depth $z$, have a propagation time given by $$T_p = \frac{2}{c} \sqrt{(x - x_0)^2 + z^2}$$

$$\cong \frac{2z}{c} + \frac{x_0^2}{zc} + \frac{x^2}{zc} - \frac{2xx_0}{zc}$$

To compensate for this propagation time using an array we must deal with those components which vary with the transducer coordinate $x$. The $x^2/2z$ term is the quadratic focusing term previously described. The $2xx_0/zc$ is the new deflection term. If an array of delays having this variation is used, the array will essentially be pointed at an angle of $\tan^{-1}(x_0/z)$. Notice that these delays are proportional to $x$ so that they increase with positive $x$ values and decrease with negative $x$ values. The other two terms in $T_p$, $2z/c + x_0^2/zc$, represent the propagation time from the target and are independent of the transducer coordinate $x$.

Deflection delay elements 30 are switched following each round trip to change the angle of the scan from the origin. Unlike the focusing delays 21 and 22 they need not be changed during the propagation interval. They can be switched fixed delay lines or CCD's whose clock frequency is changed for each complete line scan. Since they vary linearly with $x$, for an on-axis scan all the lines in 30 would have an equal delay $T_1$. For deflection, delay element 32 would be switched to $T_1 + \Delta$, 31 to $T_1 + 2\Delta$, 33 to $T_1 - \Delta$, and 34 to $T_1 - 2\Delta$ where $\Delta$ determines the angle of deflection. For small angles $\Delta$ is given by $$\Delta = (2x\theta/c)$$

where $\theta$ is the deflection angle.

Following deflection the system can be electronically focused exactly as in FIG. 1 using focusing delay lines 21 and 22. FIG. 2 shows two variations on these focusing systems. Since the focusing delay requirement is an even function, the same focusing delay requirements exist for transducer elements having the same distance to the transducer axis. Thus focusing delay 21, as shown in FIG. 2, can be made with half the number of delay elements by first tying the transducer signals from transducers 14 and 17 together and 15 and 16 together since they require the same delay. As shown, focusing delay system 21 is then reduced to half the number of elements.

Focusing delay lines 22 can be constructed in the identical fashion, with the opposite variation of delay, and the outputs applied to an adder. As an alternate arrangement, focusing delay lines 22 and 23 in FIG. 1 can be replaced by a focusing delay line 36 shown in FIG. 2. In the tapped delay line, the signal requiring the longest delay is placed at the sending end of the delay line, with the signal requiring the shortest delay placed at tap 36 nearest the terminating end of the delay line 35. Intermediate taps are used for the intermediate transducer signals as required. This construction reduces the number of delay elements used and automatically provides the adding function. Delay lines 21 and tapped delay line 35 in FIG. 2 can be made of any type of delay structures including CCD's. Either one or both can be made time-varying as previously indicated. Although they are shown following the deflection delay system in FIG. 2, this same focusing system can be used in the non-deflected system of FIG. 1.

Figure 3:
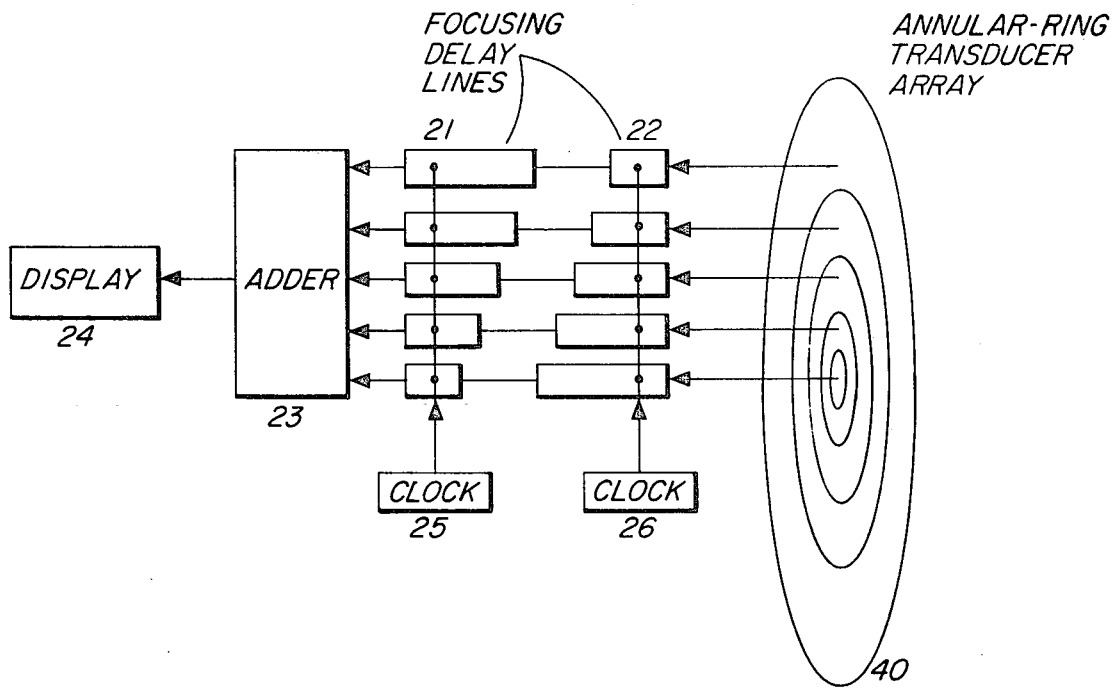
FIG. 3 illustrates an embodiment using a concentric annular ring transducer array.

The systems described thusfar have provided focusing in one dimension only. FIG. 3 illustrates a system for focusing in both dimensions using a concentric-ring transducer array 40. The transmit system is not shown, although the transmit system of FIG. 1 can be used. The same set of focusing delay lines 22 and 21, having opposite variations with radius, are connected to the transducer signals at each annular ring. These can both be time-varying CCD's controlled by clocks 25 and 26, or one delay system can be fixed with the other time varying. This system does not provide electronic deflection and would be manually scanned. The electronic focusing would provide good lateral resolution in all dimensions.

Two-dimensional focusing can also be achieved by using the systems of FIGS. 1 and 2 in the receive mode only and using a transmitter array pattern which provides focusing in the orthogonal direction. One method of doing this is the use of a ring or annular transmitter array such as that of the previously described U.S. Pat. No. 3,918,024. In this system the transmitted beam provides good resolution, in one lateral dimension, at all depths. The dynamically focused linear array provides focusing in the other dimension with the overall product of the patterns having the desired two-dimensional focusing at all depths.

Figure 4:
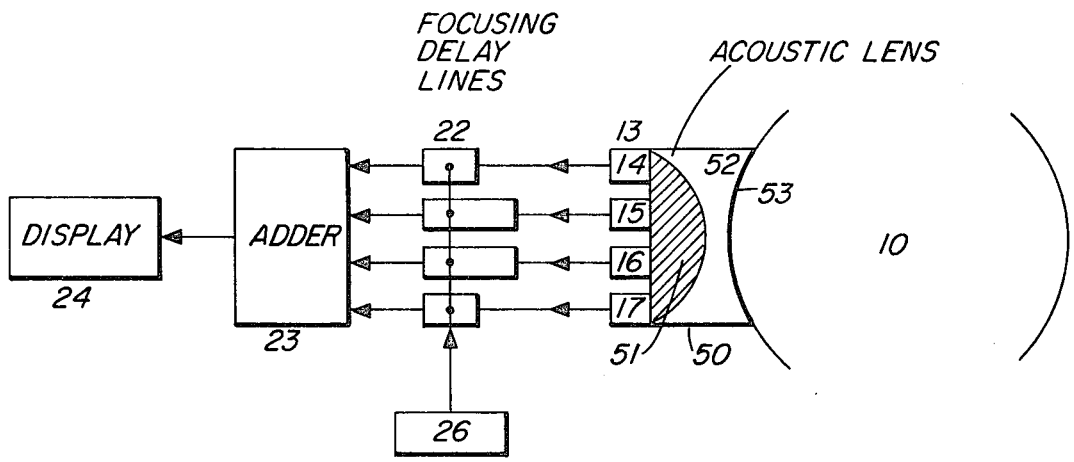
FIG. 4 illustrates an embodiment using an acoustic lens.

To avoid the complexity of two focusing delay systems, the system in FIG. 4 can be used. Here the delay compensation required for focusing is apportioned before and after transducer array 13. A lens 51 is used before the transducer array 13 to provide increasing time delay, with distance to the transducer axis, for the ultrasonic reflections. Following the transducer array 13 the transducer signals are subjected to decreasing time delay, with distance to the transducer axis, using focusing delay lines 22. The delay line outputs are added in 23, as before, to form a focused signal which is displayed on display 24. This same configuration can use the deflection delay lines 30 of FIG. 2 to obtain a real-time sector scan. Also the array of focusing delay lines 22 can be simplified by using the transducer signals in pairs as in 21 in FIG. 2 or by using a tapped delay line as in 35 in FIG. 2 to accomplish both the delay and adder functions. If the focusing delay lines 22 are CCD's driven by clock 26 the system would have the advantage that only a single variable-frequency clock is used to control the depth of focusing. In this way undesired beat frequencies between clock frequencies are avoided.

In the lens system, lens 51 is normally a solid material, such as lucite, whose velocity of propagation $c_1$ is normally greater than $c$, that of water. Thus the convex lens shown becomes a negative lens, unlike the standard case in optics. A negative lens has an increasing time delay with radius. The relative time delay T of various radii $r$ along the lens compared to that of the axis is given by $$T \simeq \frac{\frac{1}{c_1} - \frac{1}{c}}{2R} r^2$$

where $R$ is the radius of curvature of lens 51. Thus with $c_1 > c$, the delay decreases with the square of the radius of transducer distance to the axis. The lens 51 is housed in water-tight housing 50 which contains fluid 52 which is generally water and flexible coupling membrane 53. This membrane conforms to the contours of object 10 to assure good contact. Since the object 10 is normally soft-tissue, it has the same velocity properties as the water 52 and thus does not distort the lens action.

Although the system of FIG. 4 utilized a negative lens and a focused delay-line array which decreased with the square of the distance to the axis, the opposite arrangement can also be used. The lens system can be made positive by either using a concave structure for solid lens 51, or continuing to use a convex lens but with a velocity $c_1$ less than $c$. Velocities less than that of water can be achieved with various liquids. These would be enclosed by a membrane to provide the convex shape. With a positive lens, focused delay-line array 22 would then provide increased delay with the sequence of the distance to the axis.

What is claimed is:
1. Apparatus for receiving ultrasonic reflections from an object comprising:
   a source of pulsed ultrasonic radiation which insonifies the object and produces a sequence of ultrasonic reflections;
   a transducer array for receiving the sequence of ultrasonic reflections and producing a plurality of transducer signals;
   a first focusing array of delay structures whose inputs are connected to the transducer signals and whose delay varies with the magnitude of the distance of each transducer to the axis of the array;
   a second focusing array of delay structurs whose inputs are connected to the outputs of the first focusing array of delay structures and whose delay varies with the magnitude of the distance of each transducer to the axis of the array in a manner opposite to that of the first focusing array of delay structures so that the sum of the delays from each transducer through the first and second focusing delay structures decreases with the magnitude of the distance to the axis of the array;
   means for adding the outputs of the second focusing array of delay structures to produce a focused signal; and
   means for utilizing the focused signal.

2. Apparatus as recited in claim 1 wherein the first focusing delay array is time-varying and the second focusing delay array is fixed so that the total delay difference from each transducer substantially compensates for the propagation delay difference from each ultrasonic reflection to each transducer whereby focusing is achieved.

3. Apparatus as recited in claim 1 wherein the first focusing delay array is fixed and the second focusing delay array is time-varying so that the total delay difference from each transducer substantially compensates for the propagation delay difference from each ultrasonic reflection to each transducer focusing is achieved.

4. Apparatus as recited in claim 1 wherein the first focusing delay array is time-varying and the second focusing delay array is time-varying in a manner opposite to that of the first so that the total delay difference from each transducer substantially compensates for the propagation delay difference from each ultrasonic reflection to each transducer whereby focusing is achieved.

5. Apparatus as recited in claim 1 wherein the first focusing array of delay structures has its delays increasing substantially as the square of the distance of each transducer to the axis of the array and the second focusing array of delay structures has its delay decreasing substantially as the square of the distance of each transducer to the axis of the array.

6. Apparatus as recited in claim 1 wherein the first focusing array of delay structures has its delays decreasing substantially as the square of the distance of each transducer to the axis of the array and the second focusing array of delay structures has its delays increasing substantially as the square of the distance of each transducer to the axis of the array.

7. Apparatus as recited in claim 1 wherein the transducer signals from all transducers having the same magnitude of the distance to the axis of the array are connected together whereby the first and second focusing arrays of delay structures require fewer delay structures.

8. Apparatus as recited in claim 1 including a deflecting array of delay structures, whose delay varies in amount and in polarity substantially as the distance to the axis of the array, connected between the transducer signals and the means for adding.

9. Apparatus as recited in claim 1 wherein the second focusing array of delay structures and the means for adding consists of a tapped delay line wherein the taps are the inputs and the focused signal appears at the output.

10. Apparatus for receiving ultrasonic reflections from an object comprising:

a source of pulsed ultrasonic radiation which insonifies the object and produces a sequence of ultrasonic reflections;

a transducer array for receiving the ultrasonic reflections and producing a plurality of transducer signals;

a lens positioned adjacent to the transducer array, between the object and the transducer array, whose delay of the ultrasonic reflections varies with the magnitude of the distance of each transducer to the axis of the array;

a focusing array of time-varying delay structures whose inputs are connected to the transducer signals and whose delay varies with the magnitude of the distance of each transducer to the axis of the array in a manner opposite to that of the lens so that the delay difference of each transducer signal compensates for the delay difference from each ultrasonic reflection, through the lens, to each transducer;

means for adding the outputs of the focusing array of delay structures to produce a focused signal; and means for utilizing the focused signal.

11. Apparatus as recited in claim 10 wherein the lens is a positive lens whose delay of the ultrasonic reflections decreases with the magnitude of the distance of each transducer to the axis of the array and the delays of the focusing array of time-varying delay structures increases with the magnitude of the distance of each transducer to the axis of the array.

12. Apparatus as recited in claim 10 wherein the lens is a negative lens whose delay of the ultrasonic reflections increases with the magnitude of the distance of each transducer to the axis of the array and the delays of the focusing array of time-varying delay structures decreases with the magnitude of the distance of each transducer to the axis of the array.

13. Apparatus as recited in claim 10 wherein the variation of delay of both the lens and the focusing array of time-varying delay structures is substantially proportional to the square of the distance of each transducer to the axis of the array.

14. Apparatus as recited in claim 10 wherein the focusing array of time-varying delay structures and the means for adding consists of a tapped time-varying delay line wherein the taps are the inputs and the focused signal appears at the output.

15. Apparatus as recited in claim 10 wherein the transducer signals from all transducers having the same magnitude of the distance to the axis of the array are connected together whereby the focusing array of time-varying delay structures has a reduced number of structures.

16. Apparatus as recited in claim 10 including a deflecting array of delay structures, whose delay varies in amount and in polarity substantially as the distance to the axis of the array, connected between the transducer signals and the means for adding.

* * * * *